United States Patent [19]

Yamato et al.

[11] Patent Number: 4,850,696
[45] Date of Patent: Jul. 25, 1989

[54] VACUUM DEGREE INSPECTING DEVICE FOR SEALED UP VESSEL

[75] Inventors: Yoshihiro Yamato, Kanagawa; Tadashi Gomibuchi, Tokyo, both of Japan

[73] Assignee: Toyo Glass Company Limited, Tokyo, Japan

[21] Appl. No.: 171,083

[22] Filed: Mar. 21, 1988

[30] Foreign Application Priority Data

Mar. 27, 1987 [JP] Japan ................................. 62-44292
Aug. 10, 1987 [JP] Japan ................................ 62-121444

[51] Int. Cl.⁴ ..................... G01N 21/88; G01N 21/90
[52] U.S. Cl. .................................... 356/237; 250/223 B
[58] Field of Search ............................... 356/237, 445; 250/223 B, 356; 358/106; 209/529, 591

[56] References Cited

U.S. PATENT DOCUMENTS

| | | | |
|---|---|---|---|
| 2,524,929 | 10/1950 | Razek | 209/529 |
| 3,131,815 | 5/1964 | Mathias | 356/445 |
| 4,483,615 | 11/1984 | Bieringer et al. | 356/237 |
| 4,758,084 | 7/1988 | Tokumi et al. | 356/237 |

FOREIGN PATENT DOCUMENTS 51-7063 3/1976 Japan .
1469240 4/1977 United Kingdom ................ 356/237

Primary Examiner—Vincent P. McGraw
Attorney, Agent, or Firm—Sughrue, Mion, Zinn, Macpeak & Seas

[57] ABSTRACT

A vacuum degree inspecting device wherein a high degree of accuracy is not required for positioning of an object vessel and the degree of vacuum of an object vessel can be detected with a high S/N ratio under a reduced influence of fluctuations in size or configuration of a top (lid) wall of an object vessel. The device comprises a great diameter lens for refracting rays of light from a light source into rays of light to be irradiated upon an area including a lid wall of a sealed up vessel held at a predetermined inspection position, a beam splitter for passing part of rays from the great diameter lens therethrough and for reflecting reflected rays from the lid wall of the sealed up vessel, a condenser lens for condensing reflected rays from the beam splitter, an image sensor for detecting the thus condensed rays, and a comparator circuit for comparing an output voltage of the image sensor with a reference voltage to develop a signal representing that the sealed up vessel is acceptable or to be rejected.

9 Claims, 3 Drawing Sheets

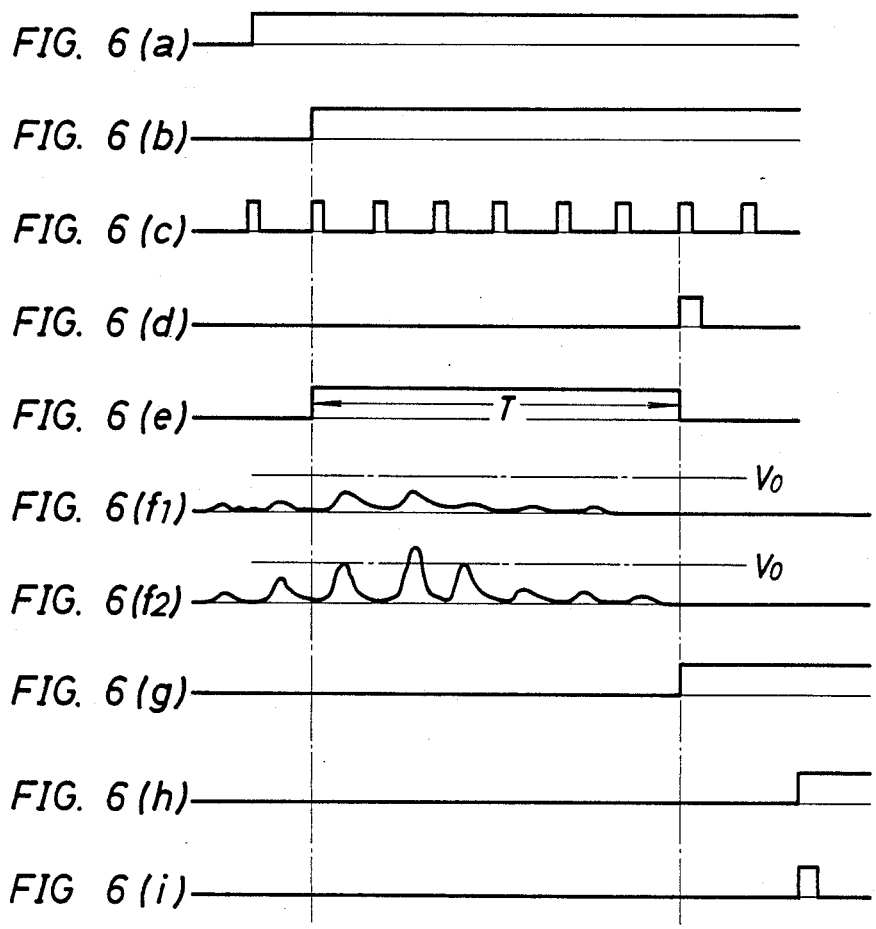

VACUUM DEGREE INSPECTING DEVICE FOR SEALED UP VESSEL

BACKGROUND OF THE INVENTION

1. Field of the Invention

This invention relates to a vacuum degree inspecting device for inspecting the degree of vacuum of a sealed up vessel in which contents are enclosed in a vacuum condition.

2. Description of the Prior Art

A so-called hot pack vessel which is sealed by a cap while contents therein remain in a hot condition decreases in pressure and thus produces a negative pressure in the inside thereof as the contents become cool. If the sealed condition is maintained, the top wall of the cap may be deformed in a concave or depressed condition, but on the contrary if the sealed condition fails, the top wall of the cap will not be deformed and will maintain its original convex or flat condition.

A device for inspecting the degree of vacuum of the inside of a vessel by optically inspecting whether the top wall of the vessel has a concave condition or a convex or flat condition is already known and is disclosed, for example, by Japanese Patent Publication No. 51-7063.

In the disclosed device, rays of light from a light source are changed into parallel rays having a diameter substantially equal to the diameter of the top wall of a vessel such as a can for canned food by means of a lens, and then the parallel rays are irradiated upon the top wall of the vessel by way of a half mirror. Then, the rays thus reflected from the top wall of the vessel are reflected by the half mirror and then received by a large number of photoelectric cells arranged in a particular plane. Outputs of the photoelectric cells are evaluated by a judging circuit which develops a signal representative of an insufficient degree of vacuum when it receives particular output signals from a number of the photoelectric cells greater than a preset value.

However, the conventional device has following drawbacks. (1) Rays of light from a light source are changed into parallel rays which have a diameter substantially equal to the diameter of the top wall of a cap of an object vessel and are to be irradiated upon the top wall of the vessel. Accordingly, the parallel rays will be displaced from the top wall of the vessel if the vessel is displaced out of position or inclined a little. Therefore, a very high degree of accuracy is required for positioning (centering) an object vessel, and accordingly the conventional device cannot be suitably mounted on an existing conveyor line or the like. (2) Reflected rays from the top wall of a cap of an object vessel are received by a large number of photoelectric cells, and the number of those photoelectric cells which provide particular output signals is detected in order to determine whether the vessel is to be accepted or to be rejected. Therefore, even if there is only a little fluctuation in size or configuration among top walls of caps of vessels, it will result in error in determination of acceptance or rejection.

SUMMARY OF THE INVENTION

It is an object of the present invention to provide a vacuum degree inspecting device wherein a high degree of accuracy is not required for positioning of an object vessel and the degree of vacuum of an object vessel can be detected with a high S/N ratio under a reduced influence of fluctuations in size or configuration of top walls (lid walls) of vessels.

In order to attain the object, according to the present invention, there is provided a device for inspecting the degree of vacuum of a sealed up vessel, comprising a light source, means for holding a sealed up vessel to be inspected at an inspection position, a large diameter lens for refracting rays of light from the light source into rays of light to be irradiated upon an area including a lid wall of a sealed up vessel held at the inspection position, a beam splitter for passing part of rays of light from the large diameter lens therethrough and for reflecting reflected rays of light from the lid wall of the sealed vessel at the inspection position, a condenser lens for condensing reflected rays of light from the beam splitter, an image sensor for detecting the thus condensed rays of light, and a comparator circuit for comparing an output voltage of the image sensor with a reference voltage to develop a signal representing that the sealed vessel is to be accepted or to be rejected.

Rays of light from the light source are refracted by the large diameter lens and partially pass through the beam splitter whereafter they are irradiated upon the entire area of the lid wall of an object sealed up vessel at the inspection position and an area around the lid wall of the vessel. Reflected rays from the lid wall of the vessel are reflected to change the direction thereof by the beam splitter and then condensed by the condenser lens whereafter they are detected by the image sensor and converted into an electric signal. The output voltage of the image sensor is compared with the reference voltage by the comparator circuit which thus develops an acceptance/rejection determination signal in response to the magnitude of the output voltage of the image sensor.

With the vacuum degree inspecting device, following effects can be anticipated.

(1) Since the large diameter lens is used to irradiate rays of light upon a wide area including the entire area of the lid wall of an object sealed up vessel at the inspection position and an area around the lid wall of the vessel, the accuracy in inspection is improved where the sealed up vessel is displaced from the inspection position or inclined. As a result, a special positioning mechanism is not required even when high speed inspection is to be effected, and the inspecting device can cope with various types of vessels.

(2) Since such a high degree of accuracy for positioning of an object vessel for inspection as required in a conventional vacuum degree inspecting device is not required, positioning of an object vessel is facilitated.

(3) The optical axis of reflected rays from the lid wall of an object vessel is changed in direction with respect to the axis of incident rays by the beam splitter, and the thus directed reflected rays are condensed by the condenser lens and then introduced into the image sensor. Accordingly, the overall height and width of the device can be reduced.

(4) Since acceptance or rejection of an object vessel is determined depending not upon the number of elements of the image sensor but upon the magnitude of the output voltage of the image sensor, detection can be attained with a high S/N ratio without being influenced very much by the accuracy in positioning of an object vessel.

According to a preferable mode of working, the vacuum degree inspecting device comprises a circuit for repetitively scanning the output voltage of the image sensor by a preset number of times, and the circuit makes a comparison of an output voltage of the image sensor with the reference voltage each time the output voltage of the image sensor is scanned. The S/N ratio is further improved by this means.

Preferably, the light source is a source of white light such as a halogen lamp in order to reduce the influence of a color of the lid face of an object sealed up vessel on the accuracy in inspection.

According to another preferable mode of working, the light source, great diameter lens, beam splitter, condenser lens, image sensor and comparator circuit are mounted in a housing which has a light dispersing window formed therein for projecting transmitted rays of light from the beam splitter outwardly of the housing therethrough, and the light throwing window is closed by a transparent glass plate to which a non-reflecting coating is applied in order to avoid a disturbance of light.

A photoelectric sensor for detecting presence or absence of a sealed up vessel to be inspected at the inspection position is mounted on an outer side of the housing. Where the sensor is mounted on the outer side of the housing in this manner, the entire vacuum degree inspecting device can be reduced in size, and the inspection position by the sensor can be adjusted simultaneously with adjustment of the location of the housing. Preferably, a light emitting element and a light receiving element of the sensor are disposed in an opposing relationship on the opposite sides of the light dispersing window of the housing.

According to a further preferable mode of working, the light emitting element and the light receiving element of the photoelectric sensor are disposed in a spaced relationship by a distance sufficient to allow a mouth portion of a sealed up vessel to pass therebetween, and a conveyor is disposed such that a sealed up vessel may be transported thereon and pass between the light emitting element and the light receiving element of the photoelectric sensor. With the arrangement, a sealed up vessel can automatically be transported to and positioned at the inspection position. In this instance, if the orientation of the image sensor is directed substantially at the right angle with respect to the direction of transportation by the conveyor, the flexibility in detection by the image sensor can be improved also against displacement of a sealed up vessel in the direction of transportation thereof.

According to a still further mode of working, a screen is disposed at a stage preceding to the image sensor, and the image sensor detects an image projected on the screen. If the image sensor has a sufficiently wide field of view, an object vessel can be detected even if it is displaced from the inspection position and consequently an image is formed at a position displaced from the image forming position. Accordingly, the flexibility against displacement of an object vessel from the inspection position is further improved.

The above and other objects, features and advantages of the present invention will become apparent from the following description and the appended claims, taken in conjunction with the accompanying drawings.

BRIEF DESCRIPTION OF THE DRAWINGS

FIGS. 6(a)–6(i) are timing charts showing operations of the circuit of FIG. 5.

DETAILED DESCRIPTION OF THE PREFERRED EMBODIMENT

Figure 1:
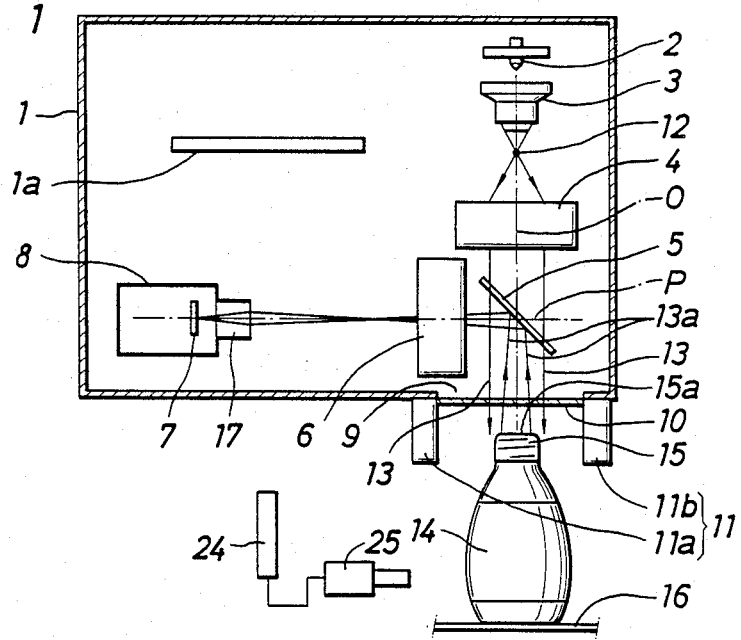
FIG. 1 is a diagrammatic representation showing general construction of a vacuum degree inspecting device according to a preferred embodiment of the present invention.
Figure 2:
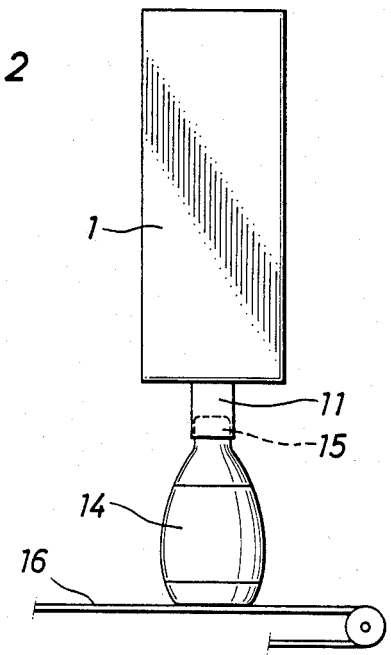
FIG. 2 is a side elevational view of the vacuum degree inspecting device of FIG. 1.
Figure 5:
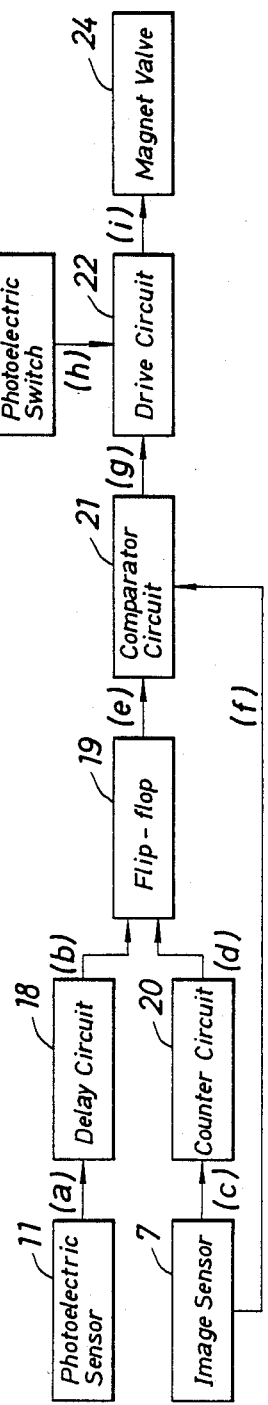
FIG. 5 is a block diagram of an electric circuit of the vacuum degree inspecting device of FIG. 1.

Referring first to FIGS. 1 and 2, there is shown a vacuum degree inspecting device according to the present invention. The vacuum degree inspecting device shown includes a housing 1 in which most of the principal components are accommodated. In particular, a halogen lamp 2 serving as a white light source, a first condenser lens 3, a large diameter lens or condenser lens 4, a beam splitter or half mirror 5 having an inclined angle of 45 degrees, a second condenser lens 6 having a large diameter, and a camera 8 in which an image sensor 7 is accommodated are mounted in the housing 1. A circuit board 1a is also located in the housing 1 and has mounted thereon an electric circuit which is shown in FIG. 5.

A light dispersing window 9 is formed at a location of a bottom wall of the housing 1 on a vertical optical axis O of the halogen lamp 2 and is sealed by a transparent glass plate 10 in order to prevent dust or moisture from entering the housing 1. Because direct reflected light from the transparent glass plate 10 will create a disturbance which influences the S/N ratio of the vacuum degree inspecting device, a non-reflecting coating is applied to the transparent glass plate 10 in order to prevent such reflection of light. It is to be noted that the transparent glass plate 10 may otherwise be mounted in an inclined posture in order to attain the same effect. A photoelectric sensor 11 is mounted on the outer side of the housing 1 and includes a light emitting element 11a and a light receiving element 11b located in an opposing relationship on the opposite sides of the light dispersing window 9.

The condenser lens 3, large diameter lens 4 and beam splitter 5 are arranged in this stated order in the downward direction along the optical axis O of the halogen lamp 2 such that rays of light from the halogen lamp 2 may be condensed by the first condenser lens 3 to form an artificial point source of light and then refracted by the large diameter lens 4 to form parallel rays 13 of uniform brightness which are then passed through the beam splitter 5 and then through the transparent glass plate 10 of the light dispersing window 9 of the housing 1 and are projected straightforwards outwardly of the housing 1.

The second condenser lens 6 and the camera 8 are arranged on a horizontal line P which intersects the optical axis O of the halogen lamp 2 at the right angle on the beam splitter 5.

A sealed vessel 14, as an object for inspection in the form of a hot pack vessel (hereinafter referred to only as a vessel), is sealed up at a mouth portion thereof with a cap 15. Such vessels 14 are transported back and forth in a direction perpendicular to the plane of FIG. 1 by means of a conveyor 16 and are positioned one by one in an inspection position between the light emitting element 11a and the light receiving element 11b of the photoelectric sensor 11. The orientation of the image sensor 7, that is, the horizontal line P, is directed perpendicularly to the direction of transportation by the conveyor 16.

The large diameter lens 4 is adjusted such that parallel rays 13 therefrom may have an extent or width sufficient to illuminate a wide area including an entire area of the top wall (lid wall) 15a of the cap 15 of the vessel 14 positioned in this manner and an area around the top wall of the cap 15. As the illuminated area of the top wall 15a of the cap 15 is increased in this manner, the beam splitter 5 used has a correspondingly wide area.

Accordingly, parallel rays 13 projected from the light dispersing window 9 are irradiated upon the full area of the top wall 15a of the cap 15 even if the vessel 14 is somewhat displaced out of position or inclined. Since the irradiating rays are rays of white light from the halogen lamp 2, reflected rays 13a from the top wall 15a of the cap 15 are little influenced by a color or a condition of a surface of the cap 15.

Figure 3:
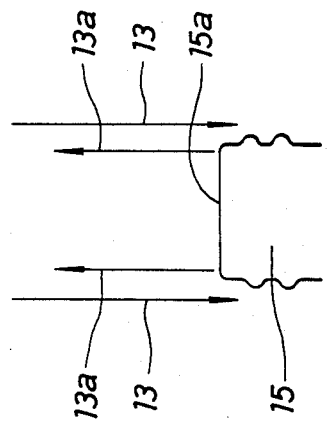
FIG. 3 is a schematic illustration showing a manner of reflection of rays of light where an object vessel is an acceptable one.

In case the vessel 14 is acceptable in that it maintains a predetermined degree of vacuum, the top wall 15a of the cap 15 presents a recessed face as illustratively shown in FIG. 3 so that it reflects the parallel rays 13 in such a manner as to condense them to some degree. The reflected rays 13a are then reflected again by the beam splitter 5 and condensed by the second condenser lens 6 whereafter they are further condensed by the lens 17 of the camera 8 and introduced into the image sensor 7 which may be, for example, of the line type. In this instance, since the optical axis of the reflected rays 13a is changed in direction by an angle of 90 degrees with respect to the optical axis of the incident parallel rays 13 by the beam splitter 5 and the reflected rays changed in direction are condensed by the second light condenser lens 6 and introduced into the image sensor 7, the overall height and width of the device can be reduced. Further, since the optical axis P of the reflected rays introduced into the image sensor 7 is directed in a direction perpendicular to the direction of transportation by the conveyor 16, even if the position of the sealed up vessel 14 on the conveyor 16 is displaced a little in the transporting direction, this will not have an influence on detection by the image sensor 7.

Figure 4:
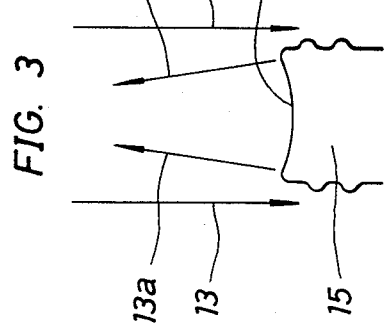
FIG. 4 is a similar view where an object vessel is to be rejected.

To the contrary, in case the vessel 14 fails to maintain a vacuum and hence is to be rejected, the top wall 15a of the cap 15 presents either a flat face or a convex face as shown in FIG. 4. Accordingly, reflected rays 13a from the top wall 15a of the cap 15 assume a form of either parallel rays or diffused rays which are then reflected by the beam splitter 5 and condensed by the second condenser lens 6 and also by the lens 17 of the camera 8 whereafter they are introduced into the image sensor 7.

Accordingly, the output voltage of the image sensor 7 is high in the case of an acceptable vessel but low in the case of a vessel to be rejected.

Referring now to FIG. 5 in which an electric circuit of the vacuum degree inspecting device is shown, a signal of the photoelectric sensor 11 shown by a waveform (a) in FIG. 6 is delayed as shown by a waveform (b) in FIG. 6 by a delay circuit 18 and then transmitted to a flip-flop 19. Meanwhile, scanning timing pulses shown by a waveform (c) in FIG. 6 from the image sensor 7 are counted by a counter circuit 20, and when the count value reaches a preset value, an inspection ending signal shown by a waveform (d) of FIG. 6 is developed from the counter circuit 20 and transmitted to the flip-flop 19. The flip-flop 19 develops an inspection time setting signal of a high voltage level as shown by a waveform (e) of FIG. 6 from a point of time at a rising edge of the signal from the delay circuit 18 shown by the waveform (b) to another point of time at a rising edge of the signal from the counter circuit 20 shown by the waveform (d). The inspection time setting signal (e) from the flip-flop 19 is transmitted to a comparator circuit 21.

The comparator circuit 21 compares a video signal (f) from the image sensor 7 with a reference voltage (judgment level) $V_o$ during a period of time T within which the inspection time setting signal (e) maintains a high voltage level. Accordingly, the output of the image sensor 7 is scanned repetitively within the time T. When the video signal (f) does not exceed the reference voltage $V_o$ during the time T as shown by a waveform ($f_1$) in FIG. 6, the comparator circuit 21 determines that the object vessel 14 is to be rejected and thus delivers a removing signal as shown by a waveform (g) in FIG. 6 to a drive circuit 22. If the drive circuit 22 receives such a removing signal (g), then it develops such a driving signal as shown by a waveform (i) in FIG. 6 to render a removing magnet valve 24 operative at a point of time when it receives such a removing timing signal as shown by a waveform (h) in FIG. 6 from a removing timing instructing photoelectric switch 23. As the magnet valve 24 operates, the vessel 14 is removed from the conveyor 16 by a rejected article removing member 25 shown in FIG. 1. It is to be noted that a removing operation for the vessel 14 may otherwise be performed after lapse of a predetermined interval of time after delivery of such a removing signal as described above or else performed in a synchronized relationship with an external signal.

On the contrary, if the video signal (f) exceeds the reference voltage $V_o$ as shown by a waveform ($f_2$) in FIG. 6 within the time T, the comparator circuit 21 determines that the vessel 14 is acceptable and does not therefore develop a removing signal as shown by a waveform (j) in FIG. 6. Accordingly, the removing magnet valve 24 is not rendered operative although the drive circuit 22 receives a removing timing signal shown by the waveform (h) from the photoelectric switch 23, and consequently the vessel 14 is transported to a next stage by the conveyor 16.

It is to be noted that another photoelectric sensor may be provided in addition to the photoelectric sensor 11 in order to cope with possible displacement of an object vessel from the inspection position by the photoelectric sensor 11. In such a modified arrangement, the two photoelectric sensors are disposed in a spaced relationship by a predetermined distance in the direction of transportation by the conveyor 16, and within a period of time from a point of time when a vessel 14 is detected by the first sensor to another point of time when the same vessel 14 is detected by the second sensor, a peak of the video signal (f) (a maximum value of the voltage) from the image sensor 7 is detected and held, whereafter the thus held peak is converted from an analog value into a digital value after detection by the second sensor. Data of the peak after analog to digital conversion may be processed on the on-line basis by a computer.

Meanwhile, referring back to FIG. 1, a translucent screen not shown may be located at a focal position of the condenser lens 6 intermediately between the lens 17 of the camera 8 and the condenser lens 6 such that rays of light may be condensed by the condenser lens 6 to form on the screen an image of the rays to be detected by the image sensor 7 of the camera 8. In this instance, the image sensor 7 is preferably provided with a sufficiently wide field of view so that a vessel 14 can be detected even if the vessel 14 is displaced from the inspection position and consequently an image is formed at a position displaced from the image forming position. With the arrangement, the flexibility against displacement of a vessel 14 from the inspection position is further improved.

In the meantime, rays of light from the large diameter lens 4 need not always assume a form of accurate parallel rays. Further, the light source may otherwise be of a different type such as a laser beam source or a light emitting diode depending upon the painted color or configuration of a cap 15. In addition, if a plurality of such vacuum degree inspecting devices are provided in a juxtaposed relationship, a plurality of vessels accommodated in a row or rows within a transport box can be inspected at a time while they are left accommodated in the box. In this instance, the distance between adjacent ones of the vacuum degree inspecting devices is conveniently adjusted in accordance with the size of the transport box, that is, the distance between adjacent vessels in the transport box.

Having now fully described the invention, it will be apparent to one of ordinary skill in the art that many changes and modifications can be made thereto without departing from the spirit and scope of the invention as set forth herein.

What is claimed is:

1. A device for inspecting the degree of vacuum of a vessel sealed with a cap, comprising:
   means for conveying the sealed vessel;
   a light source; means for holding the sealed vessel to be inspected at an inspection position;
   a large diameter lens for refracting rays of light from said light source into rays of light to be irradiated upon an area including the top surface of the cap of the sealed vessel;
   a beam splitter for passing part the rays of light refracted by said large diameter lens therethrough and for reflecting reflected rays of light from the top surface of the cap of the sealed vessel;
   a condenser lens for condensing the reflected rays of light from said beam splitter;
   an image sensor for detecting the thus condensed rays of light; and
   a comparator circuit for comparing an output voltage of said image sensor with a reference voltage to develop a signal representing that the sealed vessel is acceptable or unacceptable, wherein said large diameter lens has a diameter which is substantially larger than the diameter of the cap, the diameter of said large diameter lens being determined based on the positioning accuracy of the vessel conveyance means such that the top surface of the cap is positioned within the circumference of the rays refracted by said large diameter lens.

2. A device for inspecting the degree of vacuum of a sealed vessel as claimed in claim 1, further comprising a circuit for repetitively scanning the output voltage of said sensor by a preset number of times, said comparator circuit making a comparison with the reference voltage of an output voltage of said image sensor each time the output voltage of said image sensor is scanned.

3. A device for inspecting the degree of vacuum of a sealed up vessel as claimed in claim 1, wherein said light source is a source of white light.

4. A device for inspecting the degree of vacuum of a sealed vessel as claimed in claim 1, wherein said light source, large diameter lens, beam splitter, condenser lens, image sensor and comparator circuit are mounted in a housing which has a light dispersing window formed therein for projecting transmitted rays of light from said beam splitter outwardly of said housing therethrough, said light dispersing window being closed by a transparent glass plate to which a non-reflecting coating is applied.

5. A device for inspecting the degree of vacuum of a sealed vessel as claimed in claim 1, wherein said light source, large diameter lens, beam splitter, condenser lens, image sensor and comparator circuit are mounted in a housing which has a light dispersing window formed therein, and a photoelectric sensor for detecting presence or absence of a sealed vessel to be inspected at the inspection position is mounted on an outer side of said housing.

6. A device for inspecting the degree of vacuum of a sealed up vessel as claimed in claim 5, wherein said photoelectric sensor includes a light emitting element and a light receiving element disposed in an opposing relationship to each other on the opposite sides of said light dispersing window.

7. A device for inspecting the degree of vacuum of a sealed up vessel as claimed in claim 6, wherein said light emitting element and said light receiving element of said photoelectric sensor are disposed in a spaced relationship by a distance sufficient to allow a mouth portion of a sealed vessel to pass therebetween, and a conveyor is disposed such that a sealed vessel may be transported thereon and pass between said light emitting element and said light receiving element of said photoelectric sensor.

8. A device for inspecting the degree of vacuum of a sealed up vessel as claimed in claim 7, wherein the orientation of said image sensor is directed substantially at the right angle with respect to the direction of transportation by said conveyor.

9. The device of claim 1, further comprising another condenser lens disposed between said light source and said large diameter lens.

* * * * *